United States Patent [19]

Moore

[11] Patent Number: 4,630,476
[45] Date of Patent: Dec. 23, 1986

[54] LIQUID LEVEL GAUGE

[75] Inventor: Raymond Moore, Solihull, England

[73] Assignee: Lucas Industries Public Limited Company, England

[21] Appl. No.: 765,217

[22] Filed: Aug. 13, 1985

[30] Foreign Application Priority Data

Sep. 11, 1984 [GB] United Kingdom ............... 8422910

[51] Int. Cl.$^4$ ............................................. G01F 23/02
[52] U.S. Cl. ........................................ 73/293; 250/577
[58] Field of Search .......................... 73/293; 340/619; 250/577, 573, 575, 574; 356/399

[56] References Cited

U.S. PATENT DOCUMENTS

| | | | |
|---|---|---|---|
| 1,724,716 | 8/1929 | Kryzanowsky | 73/293 |
| 3,548,657 | 12/1970 | Panerai et al. | 73/293 |
| 3,683,196 | 8/1972 | Obenhaus | 250/577 |
| 3,733,130 | 5/1973 | Young | 250/573 |
| 3,836,253 | 9/1974 | Colvin | 250/574 |
| 3,844,171 | 10/1974 | Rodger | 73/293 |
| 3,906,241 | 9/1975 | Thompson | 250/575 |
| 4,069,838 | 1/1978 | Hansel et al. | 73/293 |
| 4,287,756 | 9/1981 | Gallagher | 73/293 |
| 4,425,794 | 1/1984 | Duesbury | 73/293 |
| 4,443,699 | 4/1984 | Keller | 73/293 |

FOREIGN PATENT DOCUMENTS

| | | |
|---|---|---|
| 0006317 | 5/1979 | European Pat. Off. . |
| 2534057 | 2/1977 | Fed. Rep. of Germany ........ 73/293 |
| 2654104 | 6/1978 | Fed. Rep. of Germany . |
| 3144541 | 5/1983 | Fed. Rep. of Germany . |

*Primary Examiner*—Charles Frankfort
*Assistant Examiner*—Thomas B. Will
*Attorney, Agent, or Firm*—Leydig, Voit & Mayer

[57] ABSTRACT

A liquid level gauge including an elongate support member, and, a plurality of optical fibres carried by the support member, said fibres extending on the support member generally lengthwise thereof and generally parallel to each other, said fibres being spaced apart from each other circumferentially of the support member and each fibre being divided at a point along the length of the support member by a gap so arranged that the transmission of the light across the gap from one part of a fibre to the other part thereof is determined by the presence or absence in the gap of the liquid being gauged, the gaps of the fibres being spaced lengthwise of the support member.

7 Claims, 5 Drawing Figures

LIQUID LEVEL GAUGE

This invention relates to a liquid level gauge of the kind which makes use of light transmission along the length of an optical fibre.

The term optical fibre is used herein to denote an elongate light conductor, and includes both optical cables wherein light is conducted along a plurality of fine filaments arranged in a bundle, and the kind of optical fibre which utilizes a single solid rod-like element.

Our earlier British Patent Application No. 2072338 discloses a liquid level gauge wherein optical fibres are arranged in a plurality of pairs, each pair being responsive to a different liquid level relative to a carrier supporting the fibres. The carrier has a channel which extends vertically in use, and along which liquid moves as the level rises and falls. The fibres are positioned at an acute angle to the channel with the fibres of each pair having an end surface exposed at the channel and liquid in the channel effecting light transmission from the immersed end surface of one fibre to the immersed end surface of the other fibre of the respective pair. The gauge of No. 2072338 works well but has certain limitations in relation to its size. The angular arrangement of fibres in relation to the vertical channel, coupled with the known limited bend radius of the fibres, particularly solid single filament fibres, results in a minimum overall size and shape of the gauge which is unsuitable for certain applications, and it is an object of the present invention to provide a liquid level gauge wherein these limitations are minimised.

A liquid level gauge according to the invention includes an elongate support member, and, a plurality of optical fibres carried by the support member, said fibres extending on the support member generally lengthwise thereof and generally parallel to each other, said fibres being spaced apart from each other circumferentially of the support member and each fibre being divided at a point along the length of the support member by a gap so arranged that the transmission of light across the gap from one part of a fibre to the other part thereof is determined by the presence or absence in the gap of the liquid being gauged, the gaps of the fibres being spaced lengthwise of the support member.

Preferably said support member is cylindrical and of circular cross-section, and said fibres are equi-angularly spaced around the circumference of the support member.

Desirably said fibres extend on said support member parallel to the longitudinal axis thereof.

Preferably the faces of the fibre presented to one another across the gap of the fibre are parallel and lie at an angle to the length of the fibre such that in the absence of liquid to be gauged in the gap light passing along the fibre and striking a face will be totally internally reflected, whereas when liquid to be gauged fills the gap light from one part of the fibre can be conducted across the gap by the liquid to the other part of the fibre.

Preferably the support member comprises an inner circular cylindrical core, and an outer circular tube coaxially surrounding the core, there being an annular passage between the inner surface of the tube and the outer surface of the core within which the fibres extend.

Preferably the gauge includes a light source disposed at one end of the support member, the fibres adjacent said one end of the support member communicating with the light source to receive light therefrom.

Desirably at one end the support member carries a first connector part at which an end of each of the optical fibres is exposed so that in use a mating second connector part engaged with said first connector part can receive light from said fibres.

Preferably where said gauge includes both said first connector part and said light source they are respectively at opposite axial ends of the support member and electrical connections to said light source are made by way of terminals in said first connector part.

The invention further resides in a method of manufacturing a liquid level gauge including the steps of securing a plurality of optical fibres to a support member and, severing each fibre intermediate its ends along the length of the support member, the fibres being severed at different points along the length of the support member.

Preferably the support member includes an inner cylindrical core of generally circular cross section and an outer tube of generally circular cross section, the tube and the core defining between them an annular passage within which said fibres extend longitudinally of the support member, the step of cutting said fibres being cutting by means of a disc-like rotating cutter and being performed by simultaneously cutting through the wall of the tube of the support member, and the individual cuts made to provide a gap in each of the fibres being spaced both longitudinally and circumferentially of the support member.

One example of the invention is illustrated in the accompanying drawings, wherein.

Figure 1:
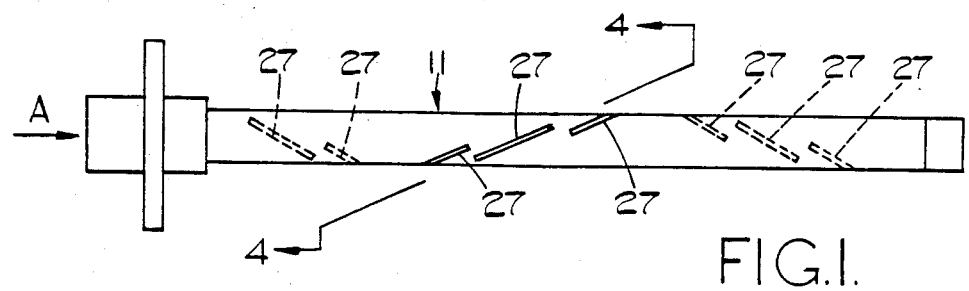
FIG. 1 is a side elevational view of a liquid level gauge.
Figure 2:
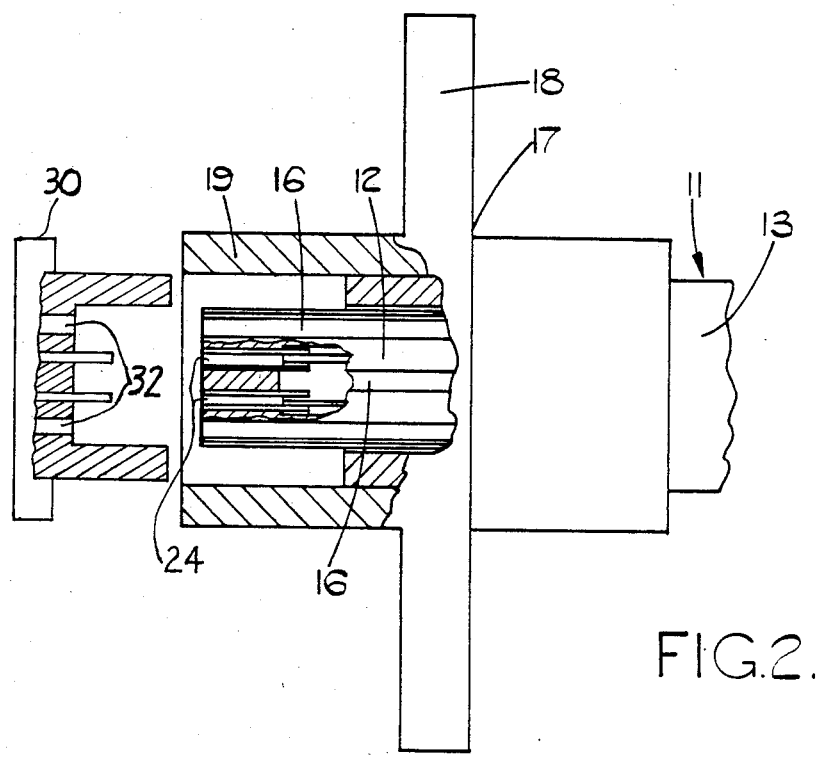
FIG. 2 is an enlarged view, partly in section of one end of the gauge of FIG. 1.
Figure 3:
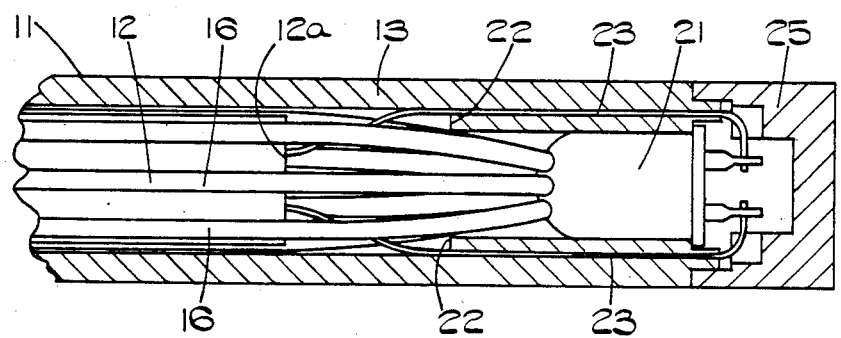
FIG. 3 is a view similar to FIG. 2 but of an opposite end region of the gauge of FIG. 1.

Referring to the drawings, the liquid level gauge includes a support member 11 comprising an elongate inner core 12 and an elongate outer sleeve 13 both formed from a plastics material, conveniently an acetal resin. Both the core 12 and the sleeve 13 are circular in transverse cross-section, and conveniently the core 12 is hollow having an axially extending passage 14. The outer diameter of the core 12 is less than the inner diameter of the sleeve 13 and the two are positioned coaxially so that an annular passage is defined between the outer surface of the core and the inner surface of the sleeve. Moreover, the outer surface of the core is formed with a plurality of equi-angularly spaced parallel axially extending grooves 15 within each of which is seated an optical fibre 16, conveniently a Mitsubishi ESKA SK-40 Acrylic based fibre. The depth of each groove 15 is less than the diameter of its respective fibre 16 and so the fibre 16 protrudes from the groove and across the annular passage to touch the inner surface of the sleeve 13. The fibres are bonded both to the core 12 and the inner surface of the sleeve 13 by a convenient adhesive, for example, the adhesive known under the Trade Mark PERMABOND E02 RESIN manufactured by Permabond Adhesives Limited, Hants, England. In order to facilitate the bonding the acetal parts are etched with chromic acid to provide a key for bonding and are then washed to remove retained acid.

At one end the support member 11 carries a housing 17 defining a mounting flange 18 and a first connector part 19. The connector part 19 comprises a sleeve open at one end, and into which the core 12 and one end of each of the fibres 16 projects.

At its end remote from the housing 17 the core 12 terminates at 12a short of the end of the sleeve 13 and within the sleeve 13 and spaced from the end 12a of the core 12 there is provided a light source 21, conveniently a light emitting diode of the ultra-bright type, for example a Hewlett Packard type HLMP 3750. The end regions of the optical fibres 16 projecting beyond the end 12a of the core 12 are deflected inwardly towards the axis of the support member 11 by a step 22 on the inner wall of the sleeve 13. The ends of the optical fibres 16 engage, and may be secured to, the light source 21 so as to receive light therefrom with a minimum of loss. Electrical leads 23 extend from the light source 21 through passages in the thickened part of the sleeve 13 and along the central passage 14 of the core 12 to terminate at electrical terminals 24 in the connector part 19. An end cap 25 closes the end of the sleeve 13 adjacent the light source 21 and provides protection for the electrical connections to the light source.

Each of the optical fibres 16 is divided, along the length of the core 12, into first and second longitudinally aligned parts by a gap 26. The gap of each fibre 16 is a parallel sided gap and the faces of the two fibre parts confronting the gap are flat and parallel to one another. These faces, and therefore the gap, are inclined with respect to the longitudinal axis of the fibre such that an angle of approximately 25° is subtended between the axis of the fibre and the plane of the gap. This angular relationship is preserved for the gap of each of the fibres 16, but the positioning of the gap in each of the fibres differs so that the gaps of the fibres are spaced longitudinally of the support member 11. Moreover, since the fibres are spaced circumferentially from one another there is a circumferential spacing as well as a longitudinal spacing between the gaps. The arrangement is best illustrated in FIG. 1 where the position of the gap 26 of a fibre corresponds to the position of a slot 27 in the sleeve and it can be seen that the inclination of the gaps together with the longitudinal and circumferential spacing is arranged to provide a generally helical disposition of the gaps in relation to the support member.

Figure 4:
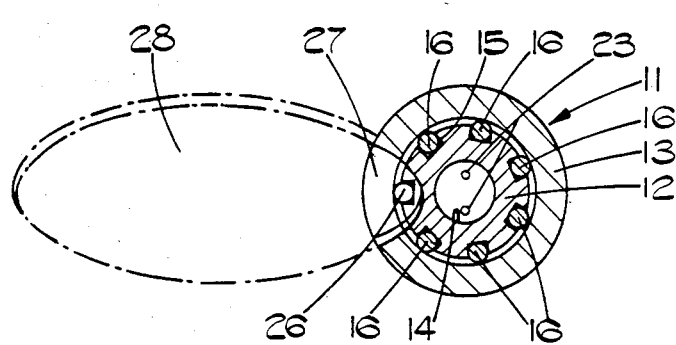
FIG. 4 is a sectional view, again enlarged, on the line 4—4 in FIG. 1.
Figure 5:
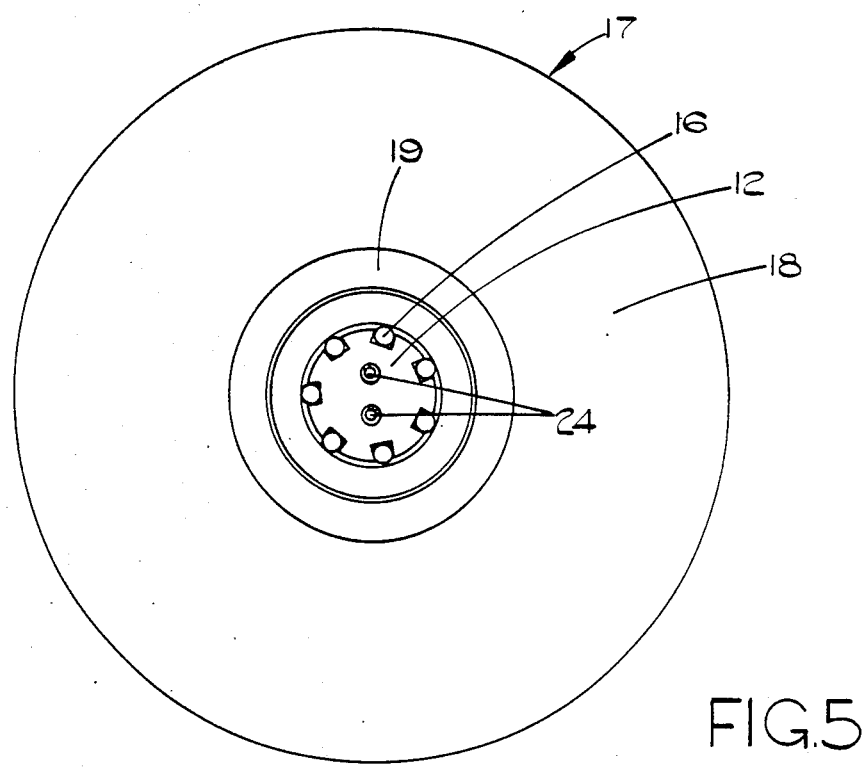
FIG. 5 is an enlarged view in the direction of arrow A in FIG. 1.

FIG. 4 taken in conjunction with FIG. 1 illustrates the manner in which the gaps 26 and corresponding slots are produced. The support member already equipped with the fibres 16 is subjected to a sequence of cutting operations using a circular cutting disc 28. The circular disc 28, which is rotated in its plane about its centre, appears as an elipse in FIG. 4 since the plane of the section of FIG. 4 is at right angles to the length of the support member 11 whereas the plane of the disc 28 is disposed at an angle of 25° to the longitudinal axis of the support member 11. The cutting disc 28, while rotating, is moved radially of the support member and so cuts the slot 27 in the sleeve 13. The depth of cut is controlled so that the cutter cuts through the optical fibre 16 and into the core 12, thus producing the gap 26 in the optical fibre. The cutting disc 28 is then withdrawn and the support member 11 is moved relative to the cutting disc both axially and angularly by predetermined amounts before performing a further, identical cutting operation which will thus produce the gap in the next fibre at a point spaced both longitudinally and circumferentially of the support member from the previous gap.

During use of the gauge the support member 11 will be positioned with its axis vertical, and generally with the light source 21 lowermost and the connector part 19 exposed at the exterior of the vessel, the liquid level in which is being gauged. Liquid from the vessel will flow into the annular passage between the sleeve 13 and the core 12 through those slots 27 in the sleeve which are immersed. The lower end of the sleeve 13 adjacent the terminals of the light source 21 is closed by a cap to avoid risk of shorting of the terminals of the light source 21 by, for example, contact with metallic components. The level to which liquid fills the annular passage between the sleeve 13 and core 12 will of course be determined by the level of liquid in the vessel, and those fibres whose gap is below the liquid level will have their gap filled with the liquid whereas the other fibres will have their gap filled with the vapour or gas above the liquid level. The material from which the fibres are formed, and the angle at which the gap is cut is so chosen in relation to the liquid to be gauged and the gas or vapour which will be present above the liquid that when no liquid fills the gap then light from the light source 21 conducted along the lower part of the fibre will reach the gap and will be totally internally reflected within the lower part of the fibre. However, where the gap is filled with liquid this total internal reflection will not occur and light from the light source 21 will be conducted by the lower part of the fibre to the gap, and will be conducted by the liquid across the gap and into the upper part of the fibre.

The connector part 30 which mates with connector part 19 may include optical fibres 32 which receive light from the ends of the fibres 16 and conduct it to a remote detector, or may instead contain the detector itself. The presence, or absence of light at the end of a fibre 16 within the connector 19 is indicative of whether or not that fibre has its gap filled with liquid, and therefore is below the level of the liquid in the vessel. The liquid level in the vessel can thus be determined by noting which of the fibres 16 conduct light to the connector part 19 and which do not.

If necessary grooves or channels can be provided to drain liquid from the gaps when the level falls, thus avoiding problems which could otherwise arise as a result of surface tension causing liquid retention in the gaps.

It will be recognised that if desired the annular passage between the sleeve 13 and the core 12 need not carry the liquid being gauged, and could if desired be filled with a convenient sealant. Access to the gaps in the fibres would then be provided solely by the slots 27 from the exterior of the support member. There would be no flow of liquid within the support member.

Where the liquid to be gauged is very dirty, or perhaps aggressively corrosive to the material of the gauge, the gauge can be provided with its own clean and non-aggressive liquid. Thus the gauge could be housed in a tube which contains the clean and non-aggressive liquid, but which is separated from the liquid being gauged by a very flexible diaphragm. In such an arrangement as the level of the liquid in the vessel changes the level of the clean and non-aggressive liquid in the tube will change correspondingly by virtue of the "mechanical" connection of the two liquids provided by the diaphragm.

In a modification of such an arrangement the slots 27 are closed by an external cover member, and the clean and/or non-aggressive liquid is provided in the annular passage between the sleeve 13 and the core 12. This passage communicates with a reservoir of the clean and/or non-aggressive liquid which reservoir has at least one wall defined by a very flexible diaphragm. The gauge together with the reservoir extends into the liquid to be gauged, and again fluctuations in the level of the liquid to be gauged are reflected by the level of the liquid in the annular passage of the gauge by virtue of the connection provided by the diaphragm.

I claim:

1. A liquid level gauge comprising an elongate support member, a plurality of optical fibres carried by the support member, said fibres extending on the support member generally lengthwise thereof and generally parallel to each other, and a light source disposed at one end of the support member, each of said fibres having one end adjacent said one end of the support member and communicating with the light source to receive light therefrom, said fibres being spaced apart from each other circumferentially of the support member and each fibre being divided at a point along the length of the support member by a gap so arranged that the transmission of light from said source across the gap from one part of the fibre to the other part thereof is determined by the presence or absence in the gaps of the liquid being gauged, the gaps of the fibres being spaced lengthwise of the support member, and the faces of each fibre presented to one another across the gap of the fibre being parallel and lying at an angle to the length of the fibre such that, in the absence of liquid to be gauged in the gap, light from said source passing along the fibre and striking a face will be totally internally reflected, whereas, when liquid to be gauged fills the gap, light from one part of the fibre can be conducted across the gap by the liquid to the other part of the fibre.

2. A gauge as claimed in claim 1 wherein the support member is cylindrical and of circular cross-section, and said fibres are equi-angularly spaced around the circumference of the support member.

3. A gauge as claimed in claim 2 wherein said fibres extend on said support member parallel to the longitudinal axis thereof.

4. A gauge as claimed in claim 1 wherein the support member comprises an inner circular cylindrical core, and an outer circular tube coaxially surrounding the core, there being an annular passage between the inner surface of the tube and the outer surface of the core within which the fibres extend.

5. A gauge as claimed in claim 1 wherein the support member carries a first connector part at which an end of each of the optical fibres is exposed so that in use a mating second connector part engaged with said first connector part can receive light from said fibres.

6. A gauge as claimed in claim 5 including a light source for the fibres said connection part and said light source being respectively at opposite axial ends of the support member, and electrical connections to said light source being made by way of terminals in said first connector part.

7. A liquid level gauge according to claim 1 including a light connector at one end of said support member, said fibres having substantially the same length and co-extending between said light source at one end of said support member and said light connector at the opposite end of said support member.

* * * * *